US010865858B2

(12) United States Patent
Arneth et al.

(10) Patent No.: US 10,865,858 B2
(45) Date of Patent: Dec. 15, 2020

(54) BELT TENSIONER

(71) Applicant: SCHAEFFLER TECHNOLOGIES AG & CO. KG, Herzogenaurach (DE)

(72) Inventors: Roland Arneth, Eggolsheim (DE);
Alexander Weidner, Fuerth (DE);
Zoran Maricic, Fuerth (DE)

(73) Assignee: SCHAEFFLER TECHNOLOGIES AG & CO.KG, Herzogenaurach (DE)

( * ) Notice: Subject to any disclaimer, the term of this patent is extended or adjusted under 35 U.S.C. 154(b) by 314 days.

(21) Appl. No.: 15/578,926

(22) PCT Filed: May 30, 2016

(86) PCT No.: PCT/DE2016/200256
§ 371 (c)(1),
(2) Date: Dec. 1, 2017

(87) PCT Pub. No.: WO2016/192727
PCT Pub. Date: Dec. 8, 2016

(65) Prior Publication Data
US 2018/0172117 A1    Jun. 21, 2018

(30) Foreign Application Priority Data
Jun. 1, 2015 (DE) .................. 10 2015 210 002

(51) Int. Cl.
*F16H 7/12* (2006.01)
*F16H 7/08* (2006.01)
(Continued)

(52) U.S. Cl.
CPC ............ *F16H 7/1281* (2013.01); *F16H 7/08* (2013.01); *F02B 67/06* (2013.01); *F02N 11/04* (2013.01);
(Continued)

(58) Field of Classification Search
CPC .......... F16H 7/1281; F16H 2007/0806; F16H 2007/0808; F16H 2007/0893;
(Continued)

(56) References Cited

U.S. PATENT DOCUMENTS 4,758,208 A    7/1988  Bartos et al.
2009/0298631 A1   12/2009  Jud et al.
(Continued)

FOREIGN PATENT DOCUMENTS

DE    102008025552 A1    12/2009
DE    102011082764 A1    4/2012
(Continued)

OTHER PUBLICATIONS

WO2013087467 (A1) Translation; Clamping Device for a Belt Drive; Hartmann et al; Published: Jun. 20, 2013; Espacenet (Year: 2013).*
(Continued)

*Primary Examiner* — Michael R Mansen
*Assistant Examiner* — Raveen J Dias

(57) ABSTRACT

A belt tensioner, comprising a first and second tensioning arm supported on a generator housing, a first and second tensioning roller attached to the first and second tensioning arms and configured to apply a pre-tensioning force to an auxiliary unit belt drive, and a bow spring clamped between the first and second tensioning arms in axial overlap with the tensioning rollers and configured to produce the pre-tensioning force.

20 Claims, 4 Drawing Sheets

(51) Int. Cl.
*F02B 67/06* (2006.01)
*F02N 11/04* (2006.01)

(52) U.S. Cl.
CPC ............... *F16H 2007/0806* (2013.01); *F16H 2007/0865* (2013.01); *F16H 2007/0874* (2013.01); *F16H 2007/0893* (2013.01)

(58) Field of Classification Search
CPC ..... F16H 2007/0865; F16H 2007/0874; F16H 7/08; F16H 2007/0863
See application file for complete search history.

(56) References Cited

U.S. PATENT DOCUMENTS

| | | | |
|---|---|---|---|
| 2013/0040770 A1 | 2/2013 | Wolf et al. | |
| 2013/0095967 A1* | 4/2013 | Wolf | F16H 7/1281 474/135 |
| 2013/0203535 A1* | 8/2013 | Mack | F16H 7/1281 474/134 |
| 2014/0256488 A1 | 9/2014 | Wolf et al. | |
| 2014/0315673 A1 | 10/2014 | Zacker et al. | |
| 2015/0369347 A1 | 12/2015 | Wolf et al. | |
| 2017/0009850 A1* | 1/2017 | Hartmann | F02B 67/06 |
| 2017/0306836 A1* | 10/2017 | Replete | F02B 67/06 |
| 2018/0135732 A1* | 5/2018 | Hartmann | F16H 7/1218 |
| 2018/0156317 A1* | 6/2018 | Maricic | F16H 7/1218 |
| 2018/0202521 A1* | 7/2018 | Reuschel | F16H 7/1218 |
| 2018/0298995 A1* | 10/2018 | Reuschel | F02B 67/06 |
| 2019/0186601 A1* | 6/2019 | Lee | F16H 7/1281 |
| 2019/0203811 A1* | 7/2019 | Maricic | F16H 7/08 |

FOREIGN PATENT DOCUMENTS

| | | |
|---|---|---|
| DE | 102013203957 B3 | 2/2014 |
| DE | 102012223086 A1 | 6/2014 |
| DE | 102013002993 A1 | 8/2014 |
| DE | 102013102562 A1 | 9/2014 |
| DE | 102013203522 A1 | 9/2014 |
| DE | 102013005884 A1 | 10/2014 |
| EP | 1420192 A3 | 5/2006 |
| EP | 2128489 A2 | 12/2009 |
| EP | 2557295 A2 | 2/2013 |
| WO | WO-2013087467 A1 * | 6/2013 |

OTHER PUBLICATIONS

International Search Report for International Application No. PCT/DE2016/200256 dated Sep. 30, 2016.
Office Action for German Application No. 102015210002.2, dated Jan. 29, 2016, 6 Pages.

\* cited by examiner

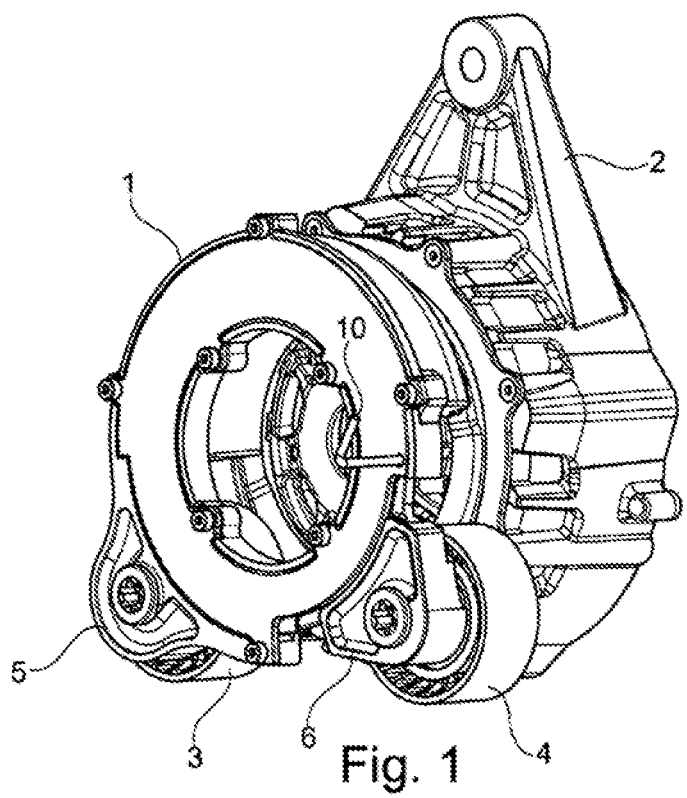
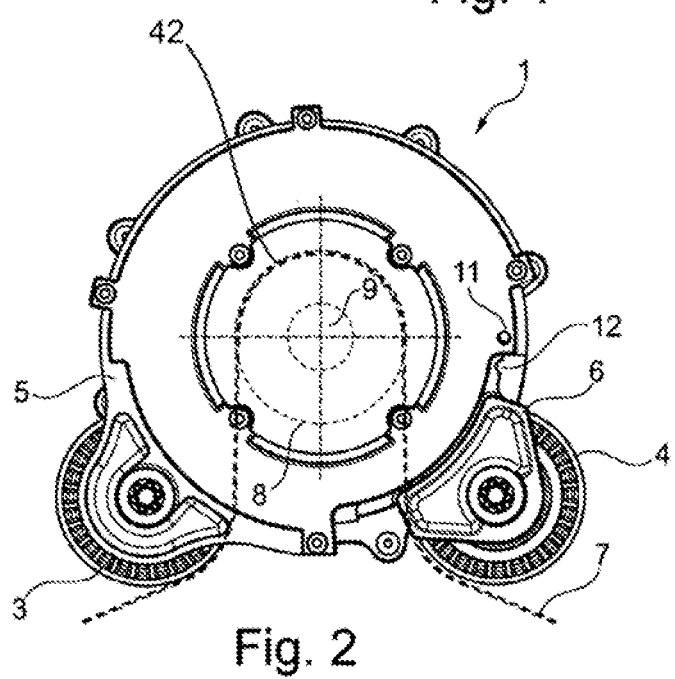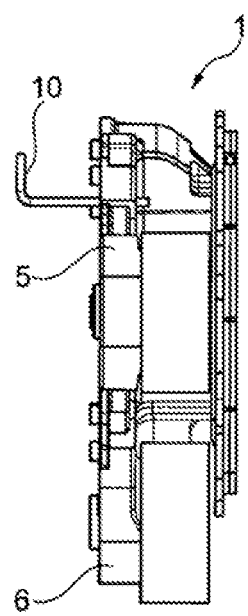

BELT TENSIONER

CROSS-REFERENCE TO RELATED APPLICATIONS

This application is the U.S. National Phase of PCT/DE2016/200256 filed May 30, 2016, which claims priority to DE 102015210002.2 filed Jun. 1, 2015, the entire disclosures of which are incorporated by reference herein.

TECHNICAL FIELD

The disclosure relates to a belt tensioner for an auxiliary-unit belt drive, which auxiliary-unit belt drive comprises a generator having a generator housing, a generator shaft, and a generator pulley, around which the belt is wrapped. The generator pulley includes:

two annularly closed tensioning arms, which are supported on the generator housing so as to be pivotable in relation to each other and in relation to the generator and which enclose the generator shaft, two tensioning rollers, which are attached to the tensioning arms and which apply pre-tensioning force to the belt in the circulation direction thereof before and after the generator pulley, and a bow spring, which produces the pre-tensioning force and which is clamped between the tensioning arms in axial overlap with the tensioning rollers, wherein the tensioning arms restrict an arcuate spring space, which accommodates the bow spring and the circumferential extent of which runs in the wrap-around region of the generator pulley and is limited by two walls of one of the tensioning arms.

BACKGROUND

Different embodiments of the belt tensioner having annularly closed tensioning arms, which enclose the generator shaft, are known from EP 2 128 489 B1. Depending on the embodiment, the spring involves a compression spring arranged radially and laterally outside of the tensioning arm bearing, a flat spiral spring arranged in the region of the tensioning arm bearing, or a yoke spring encompassing the tensioning arm bearing. The axially basically completely overlapping arrangement of the spring with the tensioning arms allows for an axially particularly compact construction of the belt tensioner.

DE 10 2012 223 086 A1 and DE 10 2013 102 562 A1 also show belt tensioners having annularly closed tensioning arms. In both publications, the spring involves a torsion spring, which encloses the generator shaft. However, in the first mentioned publication, it is not axially overlapping the tensioning rollers, and in the other publication, it is only slightly overlapping the tensioning rollers. Different from the generic belt tensioners mentioned at the beginning, these constructions require additional axial installation space.

EP 2 557 295 B1 discloses a belt tensioner having two tensioning arms, only one of which is designed in the form of a closed ring and encloses the generator shaft. The other tensioning arm is designed in the form of an open arc and is supported in a cavity of the first tensioning arm.

Further belt tensioners having tensioning arms, which can be pivoted in relation to each other and in relation to the generator are known from DE 10 2011 082 764 A1 and DE 10 2008 025 552 A1.

DE 10 2013 002 993 A1 discloses a generic belt tensioner having annularly closed tensioning arms and a bow spring clamped between said tensioning arms.

SUMMARY

The present disclosure is based on the objective of improving a generic belt tensioner by providing a compact construction.

A bow spring may be clamped between one of the walls and a driver of the other tensioning arm. The driver protrudes axially with respect to the circular-ring shaped end face of the other tensioning arm and protrudes into the spring space before the other wall.

This structural design of the spring tensioner configuration with a bow spring combines the relatively high form utilization number of a torsion spring with the extensive restriction of the spring on an arcuate installation space, without having to relinquish the geometry of the annularly closed tensioning arms, which has a favorable effect on the bearing. With sufficiently high spring capacity, the tensioning rollers and the bow spring can be easily positioned with a complete or almost complete axial overlap in the wrap-around region of the generator pulley. It is generally known that a bow spring always involves a compression spring having an open arcuate longitudinal extension. The form utilization number compares the absorbed energy of a spring with the highest possible stored work with the same compression volume and the same material stress.

BRIEF DESCRIPTION OF THE DRAWINGS

Further characteristics and advantageous embodiments of the disclosure are included in the following description and the drawings, which show one embodiment of a belt tensioner. It is shown:

FIG. 1 a perspective view of a generator housing with the belt tensioner mounted on it;
FIG. 2 a frontal view of the belt tensioner;
FIG. 3 a lateral view of the belt tensioner.

DETAILED DESCRIPTION

Figure 4:
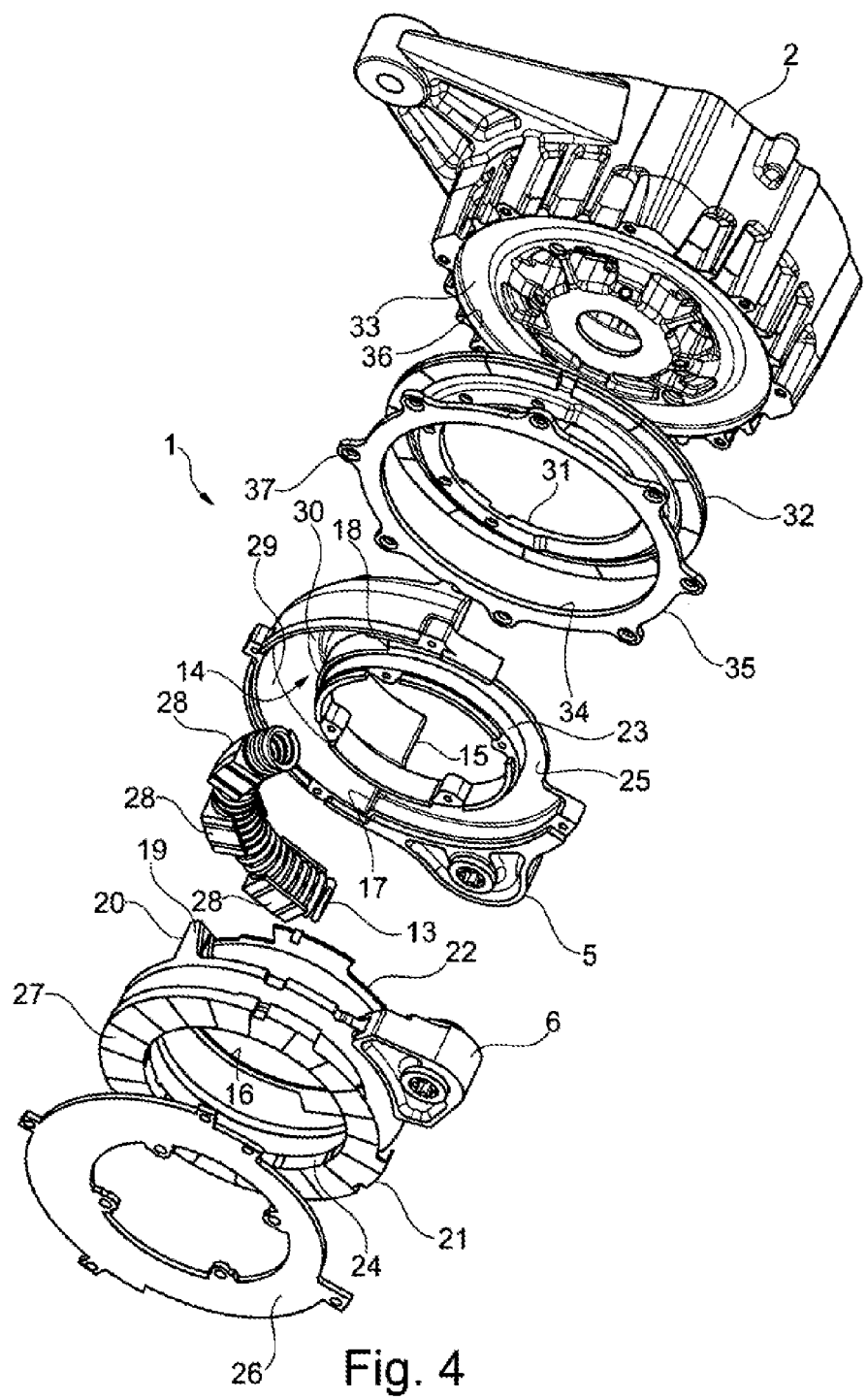
FIG. 4 an exploded perspective view of the belt tensioner.

FIG. 1 shows an inventive belt tensioner 1 of an auxiliary-unit belt drive of an internal combustion engine in assembly with the frontal part of a generator housing, or the side where the belt is located. The generator is not only used for power generation but is also operated as a (driving) motor for starting the belt or boosting the internal combustion engine. The belt tensioner 1 comprises two tensioning rollers 3 and 4 on tensioning arms 5 and 6, which are supported on the generator housing 2 so as to be pivotable in relation to each other and in relation to the generator in order to pre-tension the return side of the belt, which alternates operation-dependent with the pulling side.

The frontal view of the belt tensioner 1 shown in FIG. 2 is supplemented by the schematically marked belt 7, as well as the schematically marked generator pulley 8. Both tensioning arms 5, 6 are annularly closed and enclose the generator shaft 9, the rotational axis of which is located concentric to the pivot bearing of the tensioning arms 5, 6. In an alternative embodiment (not shown), it is also possible to arrange the pivot bearing in non-concentric manner to the generator shaft 9, provided it is possible to mount the belt tensioner to the generator and the generator pulley 8 with the wrap-around belt 7 is able to circulate with sufficient distance in the interior of the tensioning arms 5, 6.

The belt tensioner 1 is mounted on the generator in a position in which both tensioning rollers 3, 4 are fixed as widely spaced from each other as possible. At the same time, the belt 7 is already applied on the generator pulley 8. In an alternative construction (not shown), the screw connection of the tensioning rollers can be rotated by 180°, so that then the tensioning rollers 3, 4 protrude reversely, i.e., coming from the generator, into the belt plane and the belt is applied only after the belt tensioner is mounted. The fixation is performed with a locking pin 10 according to FIGS. 1 and 3, which axially permeates the tensioning arms 5, 6 and prevents one of the tensioning arms 5 from swiveling against the other tensioning arm 6. The locking pin 10 permeates a through hole 11 of one of the tensioning arms 5 and an outer circumferential recess 12 of the other tensioning arm 6, both of which are visible in FIG. 2 when the locking pin 10 is removed. In the fixed position both tensioning rollers 3, 4 are spaced from each other to the extent that the belt 7 remains in non-tensioned condition. The belt is pre-tensioned only after the locking pin 10 is removed, wherein the tensioning rollers 3, 4 swivel toward each other and the belt 7 is tensioned in its circulating direction before and after the generator pulley 8.

The exploded view of the belt tensioner 1 shown in FIG. 4 demonstrates the spring tensioner configuration required for producing the belt-pre-tension (the representation does not show the tensioning rollers 3, 4 screwed together with the tensioning arms 5, 6). It involves a bow spring 13 clamped between the tensioning arms 5, 6, which bow spring is accommodated in parallel fashion to the belt plane in a respective arcuate spring space 14 of one of the tensioning arms 5. On the one hand, the spring space 14 is limited by an arcuate curvature 15 of one of the tensioning arms 5, which is raised in axial direction of the tensioning rollers 3, 4, and, on the other hand, by the rear end face 16 of the other tensioning arm 6. Viewed in conjunction with FIGS. 1 to 3 clearly shows that the spring space 14 and the bow spring 13 accommodated therein run in the wrap-around region 42 of the generator pulley 8 and are arranged in mostly axial overlap with the tensioning rollers 3, 4. Therefore, the belt plane can run with comparatively small axial distance to the generator housing 2, so that the moment load of the frontal generator shaft bearing remains as low as possible.

Circumferentially, the spring space 14 extends over an approximately 180° elbow angle and is limited by two walls 17 and 18 (see also FIG. 6) at the circumferential ends of the arcuate curvature 15. The bow spring 13 is clamped between one of the walls 17 of one of the tensioning arms 5 and a spring support 20 formed by a driver 19 of the other tensioning arm 6 so as to supply both tensioning rollers 3, 4 with a torque directed toward each other. The driver 19 protrudes axially with respect to the circular-ring shaped end face 16 of the other tensioning arm 6 and protrudes into the spring space 14 before the other wall 18 of one of the tensioning arms 5. Because of the fact that the spring support 20 runs completely or at least mostly in axial overlap with the tensioning roller 4, the pair of reaction forces introduced by the bow spring 13 and the tensioning roller 4 produces a comparatively small tilting moment in the pivot bearing of the other tensioning arm 6.

In particular, but not restricted to the case that a bow spring 13 with an unfavorably large elbow angle is required for wrapping the spring, it is also possible to provide two or more bow springs in series connection and a spring space 14 with a respectively adapted elbow angle.

Additionally, it is also possible to provide bow springs connected in parallel in the form of a spring assembly, which have an outer and an inner bow spring. By using these parameters, it is possible to greatly vary the overall characteristics of the spring tensioner configuration.

Both tensioning arms 5, 6 involve aluminum die-casting parts. The other tensioning arm 6 is provided with a two-piece glide coating consisting of one of the well-known synthetic bearing materials, in the present case polyamide with incorporated PTFE (polytetrafluorethylene), wherein both coating pieces 21 and 22 are snapped together. The radial pivot bearing of the other tensioning arm 6 occurs through a cylindrical outer sheath 23 of one of the tensioning arms 5 and an inner sheath 24 of the frontal coating piece gliding on said outer sheath. The axial bearing of the other tensioning arm 6 occurs on the part of the generator by using the end face 16 of the rear coating piece 22 and the end face 25 of one of the tensioning arms 5 running circumferentially outside the spring space 14.

A front cover 26 produced from a plane punched sheet metal piece and screwed together with one of the tensioning arms 5 forms the end piece of the belt tensioner 1 on its front surface facing away from the generator, and together with the end face 27 of the frontal coating piece 21, it forms the axial bearing of the other tensioning arm 6 facing away from the generator. Therefore, the other tensioning arm 6 is supported only on one of the tensioning arms 5 with the front cover 26 but has no contact with the generator housing 2.

If required, it is possible to impede or completely prevent dust and spills from penetrating the interior of the belt tensioner 1 by using additional seals (not shown).

At the external arc of the bow spring 13, three U-shaped sliding blocks 28 consisting of polyamide are fixated, which sliding blocks support the reaction force of the bow spring 13 in radial outer direction and in bilateral axial direction at the tensioning arms 5, 6. The radial support occurs through the sliding contact of the sliding blocks 28 with the arcuate inner sheath 29 of the spring space 14. The axial support, which prevents an axial evasion or bending of the bow spring 13, is provided by the generator through the sliding contact of the sliding blocks 28 with the floor 30 of the spring space 14. On the opposite side, the axial support is provided through the sliding contact of the basically plane sliding blocks 28 there with the rear end face 16' of the other tensioning arm 6, the rear coating piece 22 of which is recessed in this contact region; see FIG. 7.

The plurality of the sliding contacts, each of which is formed by a plastic surface and metal surface in the embodiment shown, results in an extensive scope in the coordination of the friction characteristics, and thus the operational attenuation characteristics of the belt tensioner 1. When coordinating the sliding contacts with respect to their material combination, surface shape and surface roughness, as well as possibly their lubrication, it is also important to consider their relative movements. For example, these increase between the sliding blocks 28 and the end face 16' of the other tensioning arm 6, when viewing the sliding blocks starting with the driver 19 in the direction of one of the walls 17. Reversely, the relative movements between the sliding blocks 28, and the inner sheath 29 and floor of the spring space 14 are decreasing.

For the pivot bearing on the generator housing 2, the belt tensioner 1 has a bearing ring 31 attached on the outer side of the curvature 15. Said bearing ring 31 is covered with a glide coating 32, which also consists of polyamide, and which is supported in axial direction between an end face 33 of the generator housing 2 and an end face 34 of a bearing cover 35 attached on the generator housing 2. The end face 33 of the generator housing 2 is part of a depression, at the inner sheath 36 of which the glide coating 32 of the bearing ring 31 is supported in axial direction. Therefore, the bearing cover 35 can have a planar design and, in the present case, it is an annularly closed sheet metal part, which is screwed at a total of eight circumferentially distributed screw points 37 with the generator housing 2.

Figure 5:
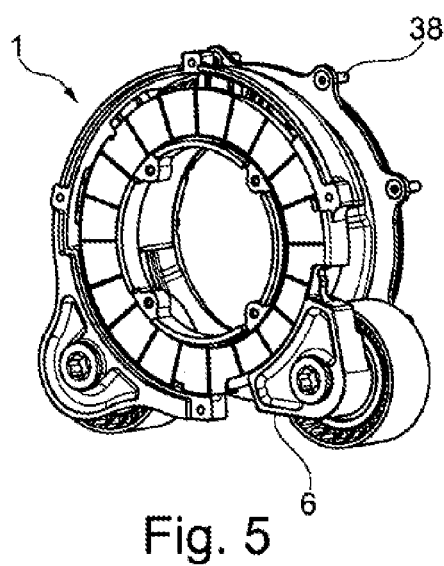
FIG. 5 a perspective frontal view of the belt tensioner without front cover.
Figure 6:
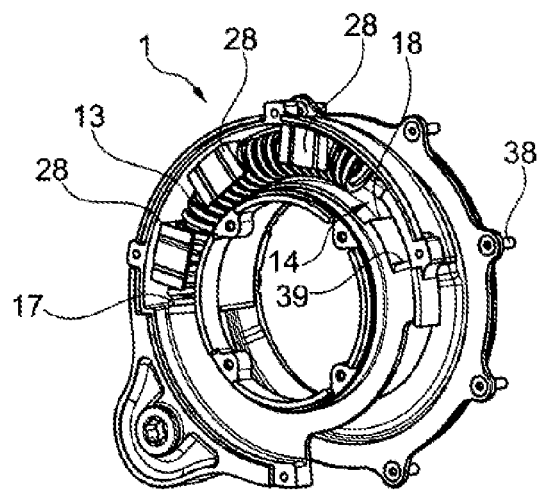
FIG. 6 the view according to FIG. 5, with the other tensioning arm removed.
Figure 7:
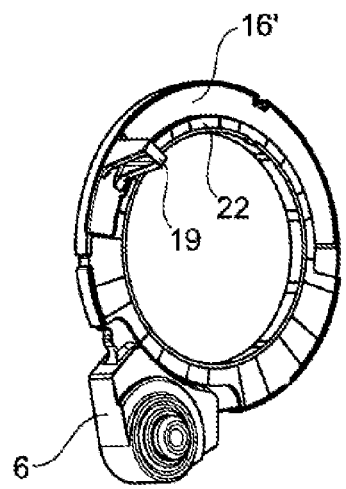
FIG. 7 a perspective rear view of the other tensioning arm.

FIGS. 5 and 6 show the belt tensioner 1 assembled with the bearing cover screws 38. However, the front cover 26, as well as the other tensioning arm 6 have been removed. When mounting the other tensioning arm 6 (the rear side of which facing the generator is shown in FIG. 7), the bow spring 13 with the mounted sliding blocks 28 is inserted in the spring space 14, wherein—different from representation in FIG. 6—the spring ends are attached with low pre-tension at one of the walls 17 and at the other wall 18, which runs behind the driver 19. The other wall 18 is provided with a recess 39 for accommodating the driver 19, so that said driver can freely move toward the bow spring 13 when the other tensioning arm 6 is mounted to one of the tensioning arms 5. When subsequently rotating the other tensioning arm 6 into the fixed mounting position according to FIG. 1, the driver 19 raises the bow spring 13 and pre-tensions it, so that the bow spring 13 is clamped in all operational positions of the belt tensioner 1 between one of the walls 17 and the spring support 20 of the driver 19.

Figure 8:
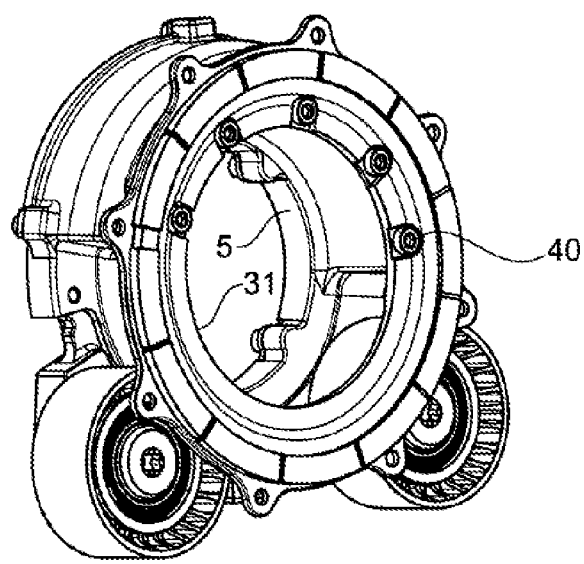
FIG. 8 a perspective rear view of the belt tensioner.
Figure 9:
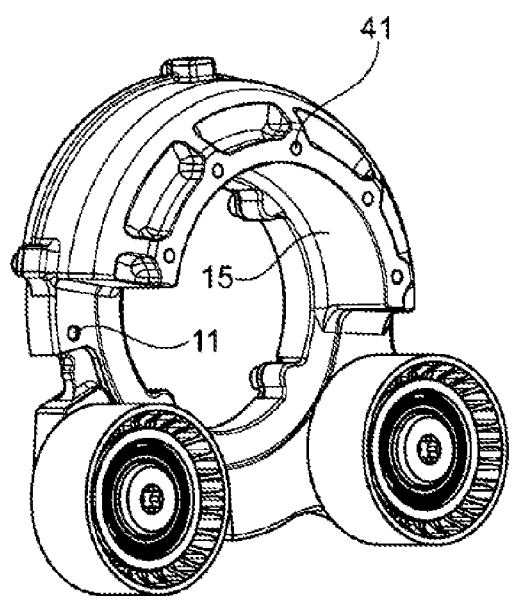
FIG. 9 the view according to FIG. 8, with the rear bearing removed.

As illustrated in FIGS. 8 and 9, the bearing ring 31 is also mounted by using a screw connection to one of the tensioning arms 5. Basically, all five screw points are located in the wrap-around region of the generator pulley 8, wherein the bearing ring screws 40 are screwed into threaded holes 41 of the curvature 15. Alternatively, it is also possible to use different known and/or non-detachable mounting types, such as caulking or riveting.

LIST OF REFERENCE NUMERALS 1 belt tensioner
2 generator housing
3 tensioning roller
4 tensioning roller
5 tensioning arm
6 tensioning arm
7 belt
8 generator pulley
9 generator shaft
10 locking pin
11 through hole
12 recess
13 bow spring
14 spring space
15 curvature
16 end face of the other tensioning arm
17 wall
18 wall
19 driver
20 spring support
21 frontal coating piece
22 rear coating piece
23 outer sheath of one tensioning arm
24 inner sheath of the frontal coating piece
25 end face of one tensioning arm
26 front cover
27 end face of the frontal coating piece
28 sliding block
29 inner sheath of the spring space
30 floor of the spring space
31 bearing ring
32 glide coating
33 end face of the generator housing
34 end face of the bearing cover
35 bearing cover
36 inner sheath of the depression
37 screw point of the bearing cover
38 bearing cover screw
39 recess
40 bearing ring screw
41 threaded hole

The invention claimed is:

1. A belt tensioner for an auxiliary-unit belt drive, which auxiliary-unit belt drive includes a generator having a generator housing, a generator shaft, and a generator pulley, around which a belt is wrapped, comprising:
   a first and second tensioning arms supported on the generator housing in pivotable in relation to each other and in relation to the generator and which enclose the generator shaft,
   a first and second tensioning rollers attached to the first and second tensioning arms respectively and configured to apply pre-tensioning force to the belt in a circulation direction thereof before and after the generator pulley, and
   a bow spring configured to produce the pre-tensioning force, wherein the bow spring is clamped between the tensioning arms in axial overlap with the tensioning rollers,
   wherein the tensioning arms restrict an arcuate spring space that accommodates the bow spring, and a wrap-around region of the generator pulley and is limited by two walls of a first tensioning arm, wherein the bow spring is clamped between a first wall of the two walls and a driver of the second tensioning arm, wherein the driver includes a protrusion that protrudes axially with respect to a circular-ring shaped end face of the second tensioning arm and protrudes into the arcuate spring space before a second wall of the two walls.

2. The belt tensioner of claim 1, wherein the bow spring is attached onto the two walls, wherein the second wall of the two walls includes a recess that accommodates the driver when the second tensioning arm is mounted to the first tensioning arm.

3. The belt tensioner of claim 1, wherein a circumference of the bow spring and one or more sliding blocks are configured to support a reaction force of the bow spring in a radial outer direction toward an inner sheath of the arcuate spring space and in axial direction toward a floor of the arcuate spring space or a circular-ring shaped end face of the second tensioning arm facing the arcuate spring space.

4. The belt tensioner of claim 1, wherein the second tensioning arm is supported in such a way that it has no contact with the generator housing.

5. The belt tensioner of claim 4, wherein the second tensioning arm is provided with a glide coating for a mutual radial and axial support of the tensioning arms.

6. The belt tensioner of claim 1, wherein the arcuate spring space is limited by an arcuate curvature of the first tensioning arm, wherein on an outer side of the arcuate curvature, a bearing ring is attached on the generator housing for pivot bearing of the belt tensioner.

7. The belt tensioner of claim 6, wherein the belt tensioner is pivotally mounted to the generator, wherein the bearing ring is covered with a glide coating and supported in axial direction between an end face of the generator housing and an end face of a bearing cover attached on the generator housing.

8. The belt tensioner of claim 7, wherein the end face of the generator housing is part of a depression, wherein the generator housing further includes an inner sheath of which the glide coating of the bearing ring is supported in a radial direction.

9. The belt tensioner of claim 8, wherein the bearing cover includes a planar sheet metal part.

10. A belt tensioner, comprising:
a first and second tensioning arm supported on a generator housing;
a first and second tensioning roller attached to the first and second tensioning arms respectively and configured to apply a pre-tensioning force to an auxiliary-unit belt drive; and
a bow spring clamped between the first and second tensioning arms in axial overlap with the first and second tensioning rollers and configured to produce the pre-tensioning force; and
a driver of the second tensioning arm, wherein the driver includes a protrusion that protrudes axially with respect to a circular-ring shaped end face of the second tensioning arm and protrudes into an arcuate spring space before a second wall of the first tensioning arm, wherein the first and second tensioning arms restrict the arcuate spring space that accommodates the bow spring, and a wrap-around region of a generator pulley that is limited by a first wall of the first tensioning arm, wherein the bow spring is clamped between the first wall and the driver.

11. The belt tensioner of claim 10, wherein the bow spring is clamped between the first wall of the first tensioning arm that includes a recess, and the driver of the second tensioning arm.

12. The belt tensioner of claim 11, wherein the driver protrudes axially with respect to the circular-ring shaped end face of the second tensioning arm and protrudes into an arcuate spring space before the second wall.

13. The belt tensioner of claim 10, the first and second tensioning arms restrict the arcuate spring space that accommodates the bow spring, and a circumferential extent that runs in the wrap-around region of the generator pulley is limited by the first wall and the second wall of the first tensioning arms.

14. The belt tensioner of claim 10, wherein at an external arc of the bow spring includes one or more sliding blocks configured to support a reaction force in a radial direction.

15. The belt tensioner of claim 10, wherein the bow spring includes a first spring end attached at a low pre-tension at the first wall.

16. A belt tensioner, comprising:
a bow spring configured to produce a pre-tensioning force, wherein the bow spring is clamped between a first and second tensioning arms in axial overlap with first and second tensioning rollers, wherein the second tensioning arm includes a driver, wherein the bow spring is clamped between a first wall of the first tensioning arm and the driver of the second tensioning arm, wherein the bow spring is in axial overlap of a wrap-around region of a generator pulley of the belt tensioner and the driver of the second tensioning arm, wherein the driver includes a protrusion that protrudes axially with respect to a circular-ring shaped end face of the second tensioning arm and protrudes into an arcuate spring space before a second wall of the first tensioning arm.

17. The belt tensioner of claim 16, wherein the bow spring is accommodated in parallel fashion to a belt plane in the respective arcuate spring space of the first tensioning arm.

18. The belt tensioner of claim 16, wherein the bow spring includes one or more sliding blocks configured to support a reaction force of the bow spring.

19. The belt tensioner of claim 18, wherein the one or more sliding blocks are configured to support the reaction force of the bow spring in a radial outer direction.

20. The belt tensioner of claim 18, wherein the one or more sliding blocks are configured to support the reaction force of the bow spring in bilateral axial direction at the first tensioning arm.

* * * * *